United States Patent [19]

Lendle et al.

[11] Patent Number: 4,986,974

[45] Date of Patent: Jan. 22, 1991

[54] PROCESS FOR THE SEPARATION OF HALOGENATED HYDROCARBONS FROM HYDROCHLORIC ACID

[75] Inventors: Wilhelm Lendle, Bad Soden am Taunus; Wolfgang Scheibitz; Heribert Tetzlaff, both of Frankfurt am Main; Bernhard Wojtech, Bad Soden am Taunus, all of Fed. Rep. of Germany

[73] Assignee: Hoechst Aktiengesellschaft, Frankfurt am Main, Fed. Rep. of Germany

[21] Appl. No.: 400,272

[22] Filed: Aug. 29, 1989

[30] Foreign Application Priority Data

Aug. 31, 1988 [DE] Fed. Rep. of Germany ....... 3829449

[51] Int. Cl.$^5$ ............................................... C01B 7/07
[52] U.S. Cl. ..................................... 423/488; 210/908; 210/909
[58] Field of Search ................ 423/488; 210/908, 909, 210/634

[56] References Cited

U.S. PATENT DOCUMENTS

| 2,137,095 | 11/1938 | Peck | 423/488 |
| 2,558,011 | 6/1951 | Sprauer et al. | 423/241 |
| 3,347,021 | 10/1967 | Hutton | 423/481 |
| 3,445,197 | 5/1969 | Resh et al. | 423/488 |
| 3,597,167 | 8/1971 | Marks et al. | 423/488 |
| 4,263,269 | 4/1981 | Little et al. | 423/488 |

FOREIGN PATENT DOCUMENTS

| 2901261 | 7/1980 | Fed. Rep. of Germany | 210/634 |
| 16387 | 2/1978 | Japan | 423/488 |
| 43194 | 4/1979 | Japan | 423/488 |

OTHER PUBLICATIONS

Chemical Abstracts 94:52380j.

Primary Examiner—Michael L. Lewis
Assistant Examiner—Brian M. Bolam

[57] ABSTRACT

A process is disclosed for the separation of halogenated hydrocarbons from concentrated hydrochloric acid, which contains 10 to 37% by weight of hydrogen chloride. The hydrochloric acid is freed from the halogenated hydrocarbons in an extraction with paraffins having more than 7 carbon atoms, or with paraffin waxes having dropping points from 70° to 160° C. or with paraffin/paraffin wax mixtures, preferably in a continuous counterflow extraction or cross-flow extraction.

13 Claims, No Drawings

PROCESS FOR THE SEPARATION OF HALOGENATED HYDROCARBONS FROM HYDROCHLORIC ACID

The invention relates to a process for the separation of halogenated hydrocarbons from concentrated hydrochloric acid.

In the chlorination of methane or the preparation of fluorochlorohydrocarbons, hydrochloric acids occur, which are contaminated with chlorohydrocarbons, fluorohydrocarbons or fluorochlorohydrocarbons. These organic impurities must be separated before these hydrochloric acids are commercially used.

U.S. Pat. No. 3,597,167 describes a purification process in which the organic impurities dissolved in the hydrochloric acid are removed by adsorption on charcoal, silicates or aluminum silicates. A disadvantage of this process is that separation and reprocessing of the adsorbent is necessary.

U.S. Pat. No. 4,263,269 proposes the removal of organic impurities by a distillation process of separation. The disadvantage of this is the high expenditure of energy which is necessary.

The object was to provide a process for the separation of halogenated hydrocarbons from concentrated hydrochloric acid, which can be economically operated with low expenditure and produces a hydrochloric acid which is substantially free from halogenated hydrocarbons and in which the separated halogenated hydrocarbons can be recycled into the distillation step of the original preparative process.

The term "concentrated hydrochloric acid" is intended to include those hydrochloric acids which contain 10 to 37% by weight, particularly 20 to 35% by weight of hydrogen chloride. "Halogenated hydrocarbons" are understood to mean in particular the compounds mono-, di-, tri- and tetrachloromethane, tri- and perchloroethylene as well as 1,1,2-trichloro-1,2,2-trifluoroethane and 1,2-dichloro-1-fluoroethane.

Surprisingly, the assigned object could be achieved in that the halogenated hydrocarbons were extracted with paraffins or paraffin waxes.

The invention therefore relates to a process for the separation of halogenated hydrocarbons from concentrated hydrochloric acid, which comprises separating the halogenated hydrocarbons by extraction with paraffins or paraffin waxes as extracting agents.

The process according to the invention is preferably carried out in such a way that at least one of the following measures is adopted:

(a) branched-chain or straight-chain paraffins having 7 to 32 carbon atoms are used as extracting agent;
(b) paraffin waxes having dropping points from 70 to 160° C. are used as extracting agent;
(c) paraffin waxes having dropping points from 100 to 125° C. are used;
(d) paraffin mixtures are used as extracting agent;
(e) mixtures of paraffins having 12 to 18 carbon atoms (hereinafter also called $C_{12}$-$C_{18}$-paraffin mixtures) are used as extracting agent;
(f) solutions of paraffin waxes and $C_{12}$-$C_{18}$-paraffin mixtures are used as extracting agent;
(g) 1 to 50 parts of paraffins which are solid at room temperature are dissolved in 100 parts of $C_{12}$-$C_{18}$-paraffin mixtures and this solution is used as extracting agent;
(h) 1 to 50 parts of paraffin waxes are dissolved in 100 parts of $C_{12}$-$C_{18}$-paraffin mixtures and this solution is used as extracting agent;
(i) the extraction is carried out as a continuously operated counterflow extraction;
(k) the extraction is carried out as a cross-flow extraction;
(l) the ratio by volume of extraction material extracting agent is adjusted to be =10:1 to 2:1;
(m) the extraction is carried out at a temperature from 0° to 110° C.;
(n) the extract (halogenated hydrocarbons) is isolated from the extracting agent by distillation and the extracting agent regenerated in this manner is recycled into the extraction.

When long-chain paraffins or paraffin waxes having a high dropping point are used as extracting agent, extraction temperatures of above 110° C. can be advantageous in the extraction. The extraction is then to be carried out as an extraction under pressure.

The n-paraffins having 10 to 35 carbon atoms produce improved extraction values in comparison with the isoparaffins. The distribution coefficient is defined as $$V = \frac{C_{org.}}{C_{acid}}$$

$C_{org.}$ = concentration of the halogenated hydrocarbon in the paraffin phase or paraffin wax phase [g/100 g of phase]
$C_{acid}$ = concentration of the halogenated hydrocarbon in the hydrochloric acid phase [g/100 g of hydrochloric acid]

The phase volume ratio is defined as A:P=[1] of hydrochloric acid : [1] of paraffin or [1] of paraffin wax.

The degree of extraction is understood to mean the quantity of halogenated hydrocarbon which is extracted from the hydrochloric acid. The degree of extraction is calculated as $$E\% = 100 \times \frac{\text{amount of chlorohydrocarbon in the untreated hydrochloric acid [g] less the amount of chlorohydrocarbon in the hydrochloric acid after extraction [g]}}{\text{the amount of chlorohydrocarbon in the untreated hydrochloric acid [g]}}$$

It is now possible, with the process according to the invention, to substantially deplete the halogenated hydrocarbons dissolved in hydrochloric acid to a total halogenated hydrocarbon of less than 3.9 ppm at low economic expenditure. In this purified form, the hydrochloric acid can be commercially used and the halogenated hydrocarbons extracted can be recycled into the distillation step of the original preparative process. The solubility of the paraffins or paraffin waxes in hydrochloric acid is below 1 ppm, and the content of undecane for example in the hydrochloric acid is less than 5 ppb.

The invention is explained in more detail by means of the examples:

Example 1

Determination of the distribution coefficients of various extracting agents

In each case, in a glass flask fitted with a stirrer, 5 l of 31% by weight strength hydrochloric acid were mixed with 1 l of extracting agent with vigorous stirring. The temperature was adjusted by means of a heat exchanger. The hydrochloric acid contained 182 ppm $CH_3Cl$
257 ppm $CH_2Cl_2$
42 ppm $CHCl_3$
146 ppm $CCl_4$.

After the attainment of equilibrium the phases were allowed to settle and the individual contents of halogenated hydrocarbon in the hydrochloric acid phase and in the paraffin phase or paraffin wax phase were determined analytically.

The results are summarized in the table.

| Extracting agent | Temp. (°C.) | Phase volume ratio A:P | Distribution coefficient | | | |
|---|---|---|---|---|---|---|
| | | | $CH_3Cl$ | $CH_2Cl_2$ | $CHCl_3$ | $CCl_4$ |
| n-Dodecane | 25 | 5:1 | 6.4 | 17.4 | 19,2 | 3340 |
| Paraffin mixture ($C_{12}$–$C_{18}$) | 25 | 6:1 | 30 | 34 | 129 | 1635 |
| Paraffin wax (Dropping point 100–105° C.) 5,6% by weight dissolved in Parraffin mixture ($C_{12}$–$C_{18}$) | 80 | 5:1 | 148 | 43 | 163 | >1190 |
| Parraffin wax (Dropping point 117–122° C.) 5,6% by weight dissolved in Paraffin mixture ($C_{12}$–$C_{18}$) | 80 | 5:1 | 275 | 88 | 184 | >1206 |
| Parraffin wax (Dropping point 158° C.) 5,9% by weight dissolved in Parraffin mixture ($C_{12}$–$C_{18}$) | 80 | 5:1 | 109 | 38 | 111 | >1020 |
| Docosane ($C_{22}$) 40% by weight dissolved in Paraffin mixture ($C_{12}$–$C_{18}$) | 50 | 5:1 | 19,6 | 16,6 | 61 | 363 |
| Dotriacontane ($D_{32}$) 20% by weight dissolved in Paraffin mixture ($C_{12}$–$C_{18}$) | 50 | 5:1 | 17,8 | 18.6 | 57 | 540 |

Example 2 (cross-flow extraction)

Hydrochloric acid (the quality of the hydrochloric acid was identical with that of Example 1) was treated with a paraffin/paraffin wax mixture at 80° C. in a 2-stage cross-flow extraction. The paraffin/paraffin wax mixture contained 94.4% by weight of $C_{12}$-$C_{18}$-paraffin mixture and 5.6% by weight of paraffin wax having a dropping point of 117°–122° C. (polyethylene wax Hoe PE 520 from Hoechst AG, Frankfurt). Adjustment was made to a phase volume ratio A:P of 5:1.

The following depletions and degrees of extraction were achieved:

| | | | | | | |
|---|---|---|---|---|---|---|
| $CH_3Cl$ | from | 182 | ppm | to | 0.4 ppm, | i.e. 99.4% |
| $CH_3Cl_2$ | from | 257 | ppm | to | 2.9 ppm, | i.e. 98.9% |
| $CHCl_3$ | from | 42 | ppm | to | 0.5 ppm, | i.e. 98.8% |
| $CCl_4$ | from | 14.6 | ppm | to | <0.1 ppm, | i.e. >99.3% |

Example 3 (cross-flow extraction)

Example 2 was repeated at 50° C., an extracting agent mixture being used which contained 20% by weight of dotriacontane and 80% by weight of $C_{12}$-$C_{18}$-paraffin mixture. The following depletions and degrees of extraction were achieved:

| | | | | | | |
|---|---|---|---|---|---|---|
| $CH_3Cl$ | from | 182 | ppm | to | 13 ppm, | i.e. 92.9% |
| $CH_2Cl_2$ | from | 257 | ppm | to | 24 ppm, | i.e. 90.7% |
| $CHCl_3$ | from | 42 | ppm | to | 0.6 ppm, | i.e. 96.2% |
| $CCl_4$ | from | 14.6 | ppm | to | <0.1 ppm, | i.e. >99.3% |

Example 4 (counterflow extraction)

Hydrochloric acid (the quality of the hydrochloric acid was identical with that of Example 1) was extracted in a 5-stage counterflow extraction with $C_{12}$–$C_{18}$-paraffin mixture at 25° C. and with a phase volume ratio A:P of 2:1.

The following depletions and degrees of extraction were achieved:

| | | | | | | |
|---|---|---|---|---|---|---|
| $Cl_3Cl$ | from | 182 | ppm | to | 500 ppb, | i.e. 99.7% |
| $CH_2Cl_2$ | from | 257 | ppm | to | <200 ppb, | i.e. >99.9% |
| $CHCl_3$ | from | 42 | ppm | to | 500 ppb, | i.e. 98.8% |
| $CCl_4$ | from | 14.6 | ppm | to | 2 ppb, | i.e. 99.99% |

Example 5 (solid adsorption)

A 20% by weight strength hydrochloric acid and solid paraffin wax having a dropping point of 100°–105° C. were vigorously stirred in a glass flask fitted with a stirrer. The paraffin wax was polyethylene wax Hoe PED 522 from Hoechst AG, Frankfurt, and had the customery particle size distribution. The treatment temperature was 25° C.; the phase volume ratio was 2 liters of hydrochloric acid per 1 kilogram of paraffin wax.

The following depletions and degrees of extraction were achieved:

| | | | | | | | |
|---|---|---|---|---|---|---|---|
| $CH_3Cl$ | from | 234 ppm | to | 181 | ppm, | i.e. | 22.7% |
| $CH_2Cl_2$ | from | 298 ppm | to | 189 | ppm, | i.e. | 36.6% |
| $CHCl_3$ | from | 73 ppm | to | 30 | ppm, | i.e. | 58.9% |
| $CCl_4$ | from | 44 ppm | to | 4.1 | ppm, | i.e. | 90.7% |

Example 6

3 l of 31% by weight strength hydrochloric acid was vigorously mixed by stirring at 25° C. with 1 l of $C_{14}$–$C_{18}$-paraffin mixture in a glass flask fitted with a stirrer and then the phases were separated by being left to settle.

The following depletions and degrees of extraction were achieved:

| | | | | | | |
|---|---|---|---|---|---|---|
| 1,2-dichloro-1-fluoroethane (R 141) | from | 997 ppm | to | 259 ppm, | i.e. | 74.0% |
| trichloroethylene | from | 1307 ppm | to | 17 ppm, | i.e. | 98.7% |
| perchloroethylene | from | 915 ppm | to | 4 ppm, | i.e. | 99.6% |
| $CCl_4$ | from | 716 ppm | to | 5 ppm, | i.e. | 99.3% |
| $CHCl_3$ | from | 713 ppm | to | 60 ppm, | i.e. | 91.6% |
| $CH_2Cl_2$ | from | 884 ppm | to | 260 ppm, | i.e. | 70.6% |

Example 7

Example 6 was repeated with the difference that now the extraction was carried out at 80° C.

The following depletions and degrees of extraction were achieved:

| | | | | | | |
|---|---|---|---|---|---|---|
| trichloroethylene | from | 1307 ppm | to | 21 ppm, | i.e. | 98.4% |
| perchloroethylene | from | 915 ppm | to | 6 ppm, | i.e. | 99.3% |
| $CCl_4$ | from | 716 ppm | to | 6 ppm, | i.e. | 99.2% |
| $CHCl_3$ | from | 713 ppm | to | 46 ppm, | i.e. | 93.5% |
| $CH_2Cl_2$ | from | 884 ppm | to | 179 ppm, | i.e. | 79.8% |

Example 8

3 l of 31% by weight strength hydrochloric acid are vigorously mixed at 80° C. in a glass flask fitted with a stirrer with a paraffin/paraffin wax mixture, containing 95% by weight of $C_{12}$–$C_{18}$-paraffin mixture and 5% by weight of paraffin wax having a dropping point of 117° to 122° C. (polyethylene wax Hoe PE 520 from Hoechst AG, Frankfurt), and the phases are then separated by being allowed to settle.

The following depletions and degrees of extraction were achieved:

| | | | | | | |
|---|---|---|---|---|---|---|
| perchloroethylene | from | 915 ppm | to | 6 ppm, | i.e. | 99.3% |
| $CCl_4$ | from | 716 ppm | to | 5 ppm, | i.e. | 99.3% |
| $CHCl_3$ | from | 713 ppm | to | 39 ppm, | i.e. | 94.5% |
| $CH_2Cl_2$ | from | 803 ppm | to | 171 ppm, | i.e. | 78.7% |

Example 9

3 l of 31% by weight strength hydrochloric acid was vigorously mixed by stirring at 0° C. in a glass flask fitted with a stirrer with 1 l of $C_{14}$–$C_{18}$-paraffin mixture and then the phases were separated by being allowed to settle. Previously, the hydrochloric acid had been treated at 0° C. with 1,1,2-trichloro-1,2,1-trifluoroethane (R 113) gas.

The following depletion and degree of extraction of R113 was achieved:

R 113 from 360 ppm to 2 ppm, i.e. 99.4%.

We claim:

1. A process for the extraction of a halogenated hydrocarbon from concentrated hydrochloric acid containing 10% to 37%, by weight of hydrogen chloride, by a continuously operated counterflow or cross-flow extraction in two or more stages with a straight-chain paraffin or a paraffin wax as extracting agent wherein the resulting hydrochloric acid has an impurities concentration of less than 3.9 ppm.

2. The process as claimed in claim 1, wherein a straight-chain paraffin having 7 to 32 carbon atoms is used as extracting agent.

3. The process as claimed in claim 1, wherein a paraffin wax having a dropping point from 70° to 160° C. is used as extracting agent.

4. The process as claimed in claim 3, wherein a paraffin wax having a dropping point of 100°–125° C. is used.

5. The process as claimed in claim 1, wherein a paraffin mixture is used as extracting agent.

6. The process as claimed in claim 1, wherein a $C_{12}$–$C_{18}$-paraffin mixture is used as extracting agent.

7. The process as claimed in claim 1, wherein a solution of a paraffin wax and a $C_{12}$–$C_{18}$-paraffin mixture is used as extracting agent.

8. The process as claimed in claim 1, wherein 1 to 50 parts of a paraffin which is solid at room temperature are dissolved in 100 parts of a $C_{12}$–$C_{18}$-paraffin mixture and this solution is used as extracting agent.

9. The process as claimed in claim 1, wherein 1 to 50 parts of a paraffin wax are dissolved in 100 parts of a $C_{12}$–$C_{18}$-paraffin mixture and this solution is used as extracting agent.

10. The process as claimed in claim 1, wherein the ratio by volume of extraction material : extracting agent is adjusted to be = 10:1 to 2:1.

11. The process as claimed in claim 1, wherein the extraction is carried out at a temperature from 0° to 110° C.

12. The process as claimed in claim 1, wherein the extract is isolated from the extracting agent by distillation and the extracting agent regenerated in this manner is recycled into the extraction.

13. The process as claimed in claim 1 wherein said concentrated hydrochloric acid has 20% to 35% by weight of hydrogen chloride.

* * * * *